(12) United States Patent
Hart

(10) Patent No.: US 6,695,968 B2
(45) Date of Patent: Feb. 24, 2004

(54) REMOVAL OF WATER SOLUBILIZED ORGANICS

(75) Inventor: Paul R. Hart, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/008,173

(22) Filed: Nov. 13, 2001

(65) Prior Publication Data

US 2003/0094413 A1 May 22, 2003

Related U.S. Application Data

(60) Provisional application No. 60/322,249, filed on Sep. 10, 2001.

(51) Int. Cl.$^7$ .............................................. B01D 11/00
(52) U.S. Cl. .................. 210/639; 210/708; 210/749; 210/698; 210/908; 507/224; 507/267; 166/267
(58) Field of Search ................................ 210/634, 638, 210/639, 708, 799, 908, 747, 698, 749; 166/267; 507/185, 267, 921, 224, 227

(56) References Cited

U.S. PATENT DOCUMENTS

| | | | |
|---|---|---|---|
| 3,687,845 A | | 8/1972 | Treat et al. |
| RE29,908 E | | 2/1979 | Fowler et al. |
| 4,401,570 A | | 8/1983 | Blytas et al. |
| 4,532,052 A | * | 7/1985 | Weaver et al. |
| 4,609,475 A | * | 9/1986 | Hanlon et al. |
| 4,657,080 A | * | 4/1987 | Hodge |
| 4,818,410 A | | 4/1989 | Bellos et al. |
| 4,839,054 A | | 6/1989 | Ruebush et al. |
| 5,236,591 A | | 8/1993 | Hart |
| 5,282,974 A | | 2/1994 | Hart |
| 5,354,477 A | | 10/1994 | Rush |
| 5,395,536 A | | 3/1995 | Brown et al. |
| 5,804,078 A | | 9/1998 | Morrow et al. |
| 5,853,592 A | | 12/1998 | Bellos et al. |
| 6,143,310 A | * | 11/2000 | Sang et al. |
| 6,153,656 A | | 11/2000 | Bourg |
| 6,159,379 A | | 12/2000 | Means et al. |
| 6,323,307 B1 | * | 11/2001 | Bigg et al. |

FOREIGN PATENT DOCUMENTS

| | | |
|---|---|---|
| DE | 44 14 261 A1 | 10/1995 |
| JP | 53-118854 | 10/1978 |
| JP | 58-92499 | 6/1983 |

OTHER PUBLICATIONS

Z. S. Gerasyuto, "Naphthenic Acids in Stratal Waters," Tr. Vses. Neft. Nauch.–Issled. Geologorazved. Inst. vol. 3, No. 42, pp. 157–161, 1973 (Original and translation).
Abstract JP53118854, Patent Abstracts of Japan, vol. 002151, Dec. 18, 1978, including WPI Abstract 78–84619A (1978).
WPI/Derwent Abstract of JP 58092499, 1983.
PCT Written Opinion for PCT/US02/25986, Aug. 19, 2003.

* cited by examiner

*Primary Examiner*—Joseph Drodge
(74) *Attorney, Agent, or Firm*—Madan, Mossman & Sriram, P.C.

(57) ABSTRACT

Methods and compositions for removing organics solubilized in a water-like fluid (WSO), such as the water produced in connection with the production of hydrocarbons from subterranean formations, are described. Hydrophilic α-hydroxy-monocarboxylic acids (AHAs), such as hydroxy-acetic (glycolic) acid, alone or optionally together with anionic polymers, have been found to be effective. The compositions and methods of this invention have reduced corrosion and scale formation problems as compared with other methods employing stronger acids to remove WSO. The AHAs have $pK_a$'s of greater than 3.8.

27 Claims, 1 Drawing Sheet

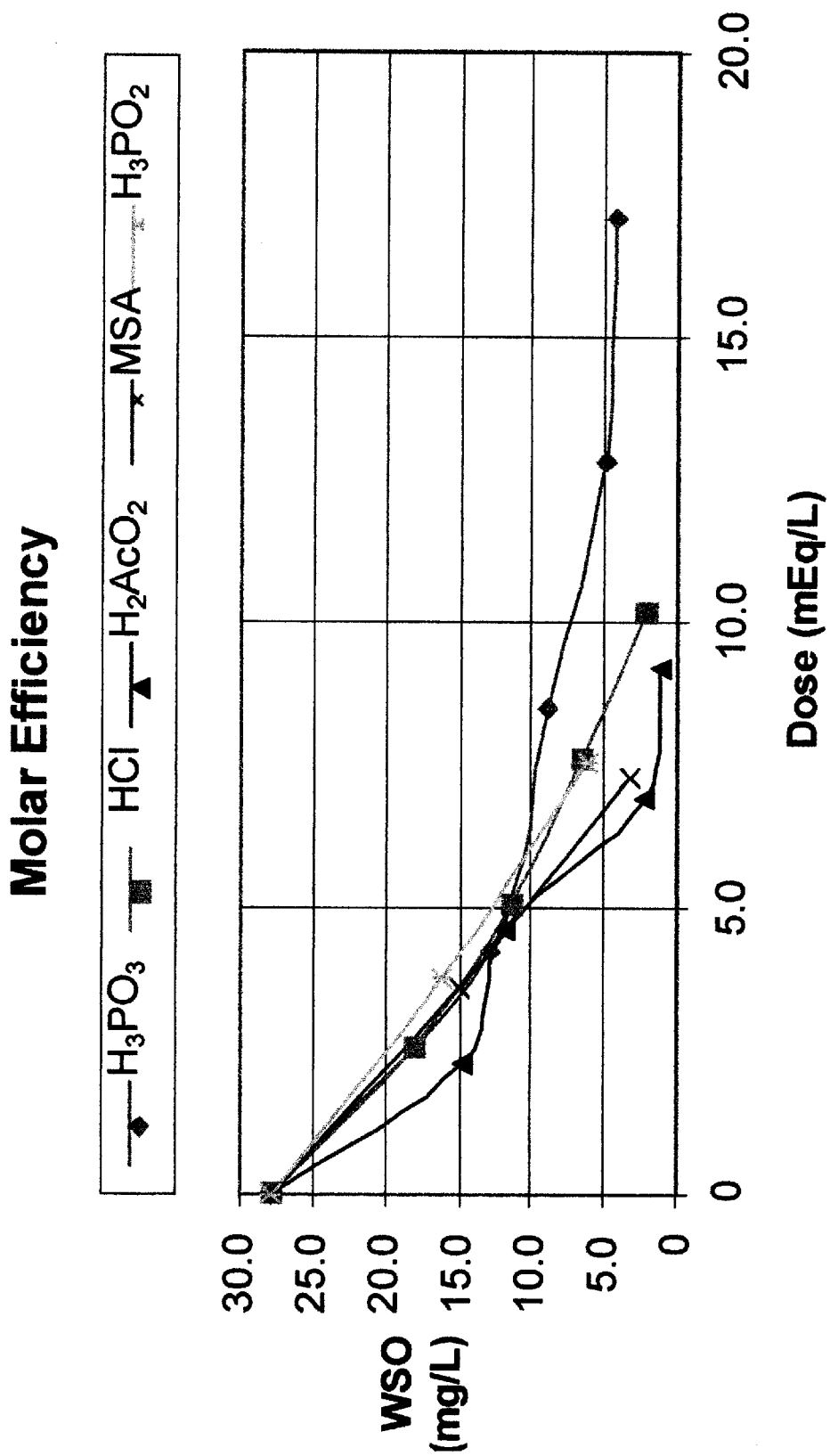

REMOVAL OF WATER SOLUBILIZED ORGANICS

This application claims the benefit of provisional application 60/322,249, filed Sep. 10, 2001.

FIELD OF THE INVENTION

The present invention relates to methods and compositions for removing solubilized organic material from water-like fluids, and more particularly relates, in one embodiment, to methods for removing solubilized organic material from water-like liquid phases using compositions having no or low corrosivity, volatility, or scaling potential.

BACKGROUND OF THE INVENTION

The production of petroleum hydrocarbons from underground formations usually produces varying amounts of formation or connate water. The production ratio of "produced water" as it is often called, to petroleum hydrocarbons usually increases over the lifetime of a well. It is not uncommon that oil well production fluids are composed of 90% or more of water and only 10% or less of crude oil. Produced oilfield water contains a diverse mixture of compounds that varies from formation to formation. Of particular importance is the "oil and grease" (O&G), a conventional pollutant defined in the Clean Water Act and codified at 40 CFR 401.16. O&G comprises those compounds which extract into a non-polar solvent, such as 1,1,2-trichlorotrifluoroethane (Freon 113) or n-Hexane, from water at a pH less than 2 (cf. EPA-600/4-79-020, Methods 413.1 and 413.2). The term "water solubilized organics" (WSO) has been used to describe a group of these components which are not so extractable when the extract is subsequently treated with silica gel (cf. EPA-821-B-94-004b, Method 1664). These silica adsorbing compounds largely comprise carboxylic acids, which naturally occur in crude oil, whose conjugate bases partition to some significant extent to the produced water at the system pH but which partition to some significant extent as acids to the extraction solvent at the more acidic extraction pH. Thus, under system conditions, they are dissolved, rather than dispersed, in the produced water.

The discharge of WSO has never been desirable. While their concentration may be relatively small, up to 1,000 ppm, they nevertheless give rise to environmental problems when the aqueous phase is discharged into the environment without their removal. These compounds are included in the discharge limits for O&G mandated by Congress in the Clean Water Act. In order to meet those ever more stringent limits, a process to reduce the level of dissolved or "solubilized" organics in the discharged water streams is needed. As discharge limits become more stringent, the need for WSO removal is expected to increase. Furthermore, the water solubilized organics are valuable substances to recover in the produced oil.

One of the first steps after removal of the oil well production fluid is to separate the oil from the water by phase separation techniques. Separation is conventionally accomplished using a bulk separator or a free water knock out system. Virtually all of the hydrocarbon is conveniently recovered in this manner. However, such traditional oil-water separation methods do not remove these WSO compounds from produced water.

Conventional water clarifiers predominantly remove dispersed or "insoluble" (not solubilized) oil and generally remove very little, if any, WSO. Cationic polymers might remove the 10–20% of the WSO associated with microemulsions in the produced water, where such emulsions exist.

Over the past several years, many other methods have been utilized to remove WSO from produced water. A variety of filtration and adsorbent media, including ceramics and activated charcoals, reverse osmosis membranes, ion exchange resins, bacterial degradation or other biological treatment, oxidation, distillation, and acidification have all been tried with various degrees of success.

One common, cost-effective method of treatment utilizes mineral acids to lower the pH of the produced water and force the WSO components into the crude oil. Acidification and extraction of the WSO into the crude is simple, cost-effective, and requires very little additional equipment. The mechanism is simple: 1) the more-water-partitioning organic anion salts are converted to the more-oil-partitioning organic acids with protonation by the stronger mineral acid and 2) these more oil partitioning organic acids are extracted into the crude. However, there are significant disadvantages to this method, including, but not limited to, the hazards of handling mineral acid, corrosion problems in storage and processing equipment, scaling of the processing equipment, and reduced effectiveness of conventional water clarifiers.

None of the materials in prior use have proven satisfactory. Hydrohalide and hydrocarboxy acids (HX, $H_2(CO_2)_x$) are volatile enough to harm human health and downstream distillation processes. Monoprotic oxy acids ($HNO_x$, $HClO_x$) have dangerous oxidation potentials. Nonvolatile, multiprotic oxy acids ($H_xSO_x$, $H_xPO_x$) are less harmful and less dangerous, but have the additional disadvantage of forming insoluble scale deposits on the production equipment. Nonacidic and cationic compounds have proven unreliable or incompatible with existing water clarifier treatments.

U.S. Pat. No. 5,395,536 discloses a process for removing carboxylic acids from aqueous solutions using a composition of a polyaluminum chlorohydrate and a cationic polyelectrolyte. After or during the initial contact of the aqueous solution with the composition, an organic liquid may optionally be added after which separation into an aqueous phase and an organic phase occurs whereby the organic acids are removed in the organic phases. The preferred polyaluminum chlorohydrate is aluminum chlorohydrate, and the preferred cationic polyelectrolyte is a high molecular weight poly (dimethyl diallyl) ammonium chloride.

Another method for removing organics, such as water soluble organics (WSO) from fluids containing water, such as oil process water is described in U.S. Pat. No. 6,159,379 that involves contacting the fluid with an effective amount of an organic ammonium salt. No added acid is necessary, although in some embodiments, weak acids such as glycolic acid, can be used to give synergistic improvement in organic removal. Suitable organic ammonium salts have the formula: $R^1R^2R^3N^+H\ X^-$, where $R^1$ is a saturated or unsaturated alkyl group or an aryl group, or saturated or unsaturated alkyl group or an aryl group substituted with a heteroatom selected from the group consisting of N, O, S, P and halogen; $R^2$ and $R^3$ are independently H or a saturated or unsaturated alkyl group or an aryl group, or saturated or unsaturated alkyl group or an aryl group substituted with a heteroatom selected from the group consisting of N, O, S, P and halogen; and X is a halogen atom or an anion of a protic acid.

It would be desirable if a simple, economical procedure for removing WSO compounds from water without the disadvantages of using strongly acidic materials could be devised.

SUMMARY OF THE INVENTION

Accordingly, it is an object of the present invention to provide a composition and method for removing WSO from produced water that does not require the use of strong acids.

It is another object of the present invention to provide a method and composition for removing WSO from produced water that does not create scaling problems and that is compatible with conventional water clarifier treatments.

In carrying out these and other objects of the invention, there is provided, in one form, a method for removing water solubilized organics (WSO) from a water-like fluid phase involving contacting the water-like fluid phase with an effective amount of a hydrophilic α-hydroxymonocarboxylic acid (AHA) and separating at least one WSO from the water.

BRIEF DESCRIPTION OF THE DRAWING

The FIGURE is a chart of the molar efficiency of various compounds at removing WSO over the indicated dosage ranges.

DETAILED DESCRIPTION OF THE INVENTION

When water is produced from underground formations along with petroleum it contains numerous impurities. One type of impurity is called oil and grease (O&G). This includes, by definition, compounds that will extract into n-hexane or Freon 113 (1,1,2-trichlorotrifluoroethane) from water acidified to pH<2. The discharge limit for O&G is typically 29 ppm, averaged over a year. (Excursions are tolerated but must be compensated for.) The purpose of this invention is the reduction of the O&G in the discharged water to this limit.

The present invention involves the use of hydrophilic α-hydroxymonocarboxylic acids (AHAs), alone or in combination with anionic polymers, to reduce the total oil and grease (O&G). It is applicable to water produced from underground formations with pH greater than about 4, containing solubilized organic compounds that are in contact with any amount of free or emulsified oil. The term "water-tike fluid phase" includes the produced water described, and also includes, but is not necessarily limited to, a water-free glycol extraction such as would occur in the oilfield, a gas plant, or petrochemical plant. The term generally would include mixtures of water and an oil-like phase, but would not include water-in-oil emulsions.

The water solubilized organic (WSO) compounds in O&G are those that partition at least partly to water in their native state but partition at least partly to oil (or at least Freon) in their acidified state. Such co- or bi-partitioning compounds are more polar than straight hydrocarbon oil and adsorb onto silica gel from the Freon extract. The portion of the O&G removed by silica gel is reported as the WSO. This includes compounds, such as butanol or benzene, which partition to some extent both ways regardless of the pH, and those, like organic acids, which partition more to water at the native pH than at the test pH. This last group of compounds is reduced by adding hydrophilic α-hydroxymonocarboxylic acids (AHAs). The first group of emulsified compounds is reduced by adding the anionic polymers in conjunction with the AHAs. If the anionic polymers are not added, the decrease in WSO resulting from the addition of the AHA can be accompanied by a corresponding increase in the emulsified oil, for no net decrease in the O&G.

Unlike the current art using mineral acids, the hydrophilic AHAs are weak organic acids, with pKa's of greater than 3.8, having the structure: RR'C(OH)COOH, where R and/or R' can be hydrogen or any nonacidic hydrocarbonaceous group provided that the total number of H's on C's plus ½ the number of C's minus 7 times any O's not attached to H's is less than 15 per OH group (including the α-OH). Otherwise, it is insufficiently hydrophilic to stay in the water. The hydrophilic condition of the AHA, RR'C(OH)COOH, may also be expressed as follows, where:

R and R' are independently selected from the group consisting of hydrogen and nonacidic hydrocarbonaceous groups, with the proviso that $$n^H + 0.5(n^C) - 7(n^O) < 15(n^{OH})$$

where
$n^H$=the total number of hydrogens on carbons,
$n^C$=the total number of carbons,
$n^O$=the total number of oxygens not attached to hydrogens, and
$n^{OH}$=the total number of —OH groups on molecule (i.e. including the α-OH)

One preferred hydrophilic AHA is hydroxyacetic (glycolic) acid (R and R'=H). This is also expected to be the least expensive one. Other suitable AHAs that meet the above definition include, but are not necessarily limited to: α-hydroxyheptanoic acid (R=$C_5H_{11}$, R'=H), α,β-dihydroxytridecanoic acid, and polypropylene glycol glycidyl acid (R=HO[$C_3H_6O$]$_n$$CH_2$, R'=H). Hydrophobic AHAs are inapplicable because they would contribute to the WSO count themselves. These AHAs are effective at dosages ranging from about 20 to about 2000 ppm, preferably from about 50 to about 500 ppm, based on the total water-like fluid treated. The water-like fluid treated might be any oil-immiscible, water-miscible phase such as brine or glycol.

Unlike the current art using strong acids, AHAs are relatively weak acids, with p$K_a$'s>3.8, several hundred times less acidic than the best currently-practiced art, which is phosphorous acid, HPO(OH)$_2$. Despite their relative weakness, however, these AHAs are effective at dosages similar to the current art, ranging from 20 to 2000 ppm based on water, when added to any produced water with pH greater than about 4. The current art treats water with pH as low as 2, but most produced water has pH>4.

Moreover, the best currently-practiced art, phosphorous acid, corrodes carbon steel even after dilution in the process and forms CaHPO$_3$ scale deposits above 100 ppm. Compared to this, the inventive compounds are far less corrosive under usage conditions, equally non-volatile, and completely non-scaling. Unlike amines and other cationic compounds, the invented compounds have a wide treatment range and are compatible with existing water clarifier treatments.

Unlike the current art that uses cationic compounds in combination with acids, or anionic compounds without acids, this invention optionally employs anionic polymers in combination with acids. Anionic polymers are those that dissociate in water to polymeric anions and individual cations. Examples include poly-(acrylic or methacrylic acids or salts), poly(acroyl or vinyl sulfonic acids or salts) and co-polymers of these with acrylic amides or esters. The preferred anionic polymers are co- or ter-polymers of (meth) acrylic acid and methyl and/or ethyl (meth)acrylate. The co-addition of anionic polymer is effective at dosages ranging from about 0.2 to about 20 ppm active, preferably from about 1 to about 5 ppm, based on the total water-like fluid treated.

The AHA is most conveniently added to the mixed oil and water production. Alternatively, it can be added to the separated produced water and then some or all of the produced oil or some other convenient oil or oil-like, water-immiscible fluid mixed back in. An "oil-like fluid phase" is defined herein as any oil phase or phase that behaves like an oil phase by being water-immiscible. It could be added prophylactically to water that would later contact the separated produced oil, as, for example, in a downstream desalter, to reduce O&G in that effluent water. In the water contacting the oil, it converts a portion of the native water partitioning organic anions into at least partly oil partitioning acids. The so converted acids, after entering the oil, dimerize into a more oil-partitioning state. Some of the oil is then separated from the water. These more oil soluble dimers leave the system with the oil. This depletes the remaining oil-water interfacial region of the acid monomer, which then draws more acid from the water into the oil. As the native acid leaves the water for the oil, more of the acid's anion is converted to acid to maintain the equilibrium. This process is repeated in a multiple batch or preferably continuous manner. In this way, even the small shift in equilibrium by the weak organic acids of this invention results in a surprisingly large depletion of WSO. The hydroxyl (—OH) group on the AHA keeps it in the water even at pH<2, so that it is not counted as oil and grease for the purpose of environmental discharge regulations. It also renders it non-toxic to and readily biodegradable by aquatic organisms, so that it is not, in fact, harmful to discharge (i.e., it is both legal and ethical). It also renders it non-volatile. Volatile acids corrode people's lungs and downstream distillation equipment.

The shift in equilibrium also consistently results, ceteris parabis, in more stable reverse emulsions and microemulsions, which partly or even more than offset the reduction of WSOs in the O&G. It is the O&G, not the WSO, that is actually controlled by regulation. This occurs because the AHA neutralizes the charge on the native anionic surfactants and intensifies the charge on the native cationic surfactants, reducing or even flipping the extant charge on the emulsion from negative to positive. The standard cationic reverse breaker used to remove these emulsions is then no longer as complementary, and may then go from being destabilizing to being restabilizing (overtreated). It is believed that adding an anionic polymer, instead of or in addition to the standard cationic reverse emulsion breaker, along with the AHA overcomes this problem and minimizes the O&G.

The removal of emulsified oil from water is known as clarification. This is typically a multi-step process. First the mixed oil and water production is separated into two bulk phases. Then the emulsified oil in water is destabilized or "treated" chemically and the oil that is "broken" out separated gravitationally or centrifugally (e.g. cyclonically). Then the residual emulsion is perhaps further treated chemically and the oil droplets reduced in density by attaching them to gas bubbles. The bubbles float and thereby "flote" the oil to the surface to be skimmed. Finally the water can be passed through filters or absorbers of various media prior to discharge. The anionic polymer can be added to the water at any point prior to the final clarification unit. The preferred addition point is prior to the flotation unit, but addition coincident with the acid addition or as part of a single product addition also has advantages in simplifying application and marketing.

The invention will be further described with respect to more specific examples that are not intended to limit its scope, but rather to more fully illuminate it.

Test Method

The following test method was developed and employed to evaluate candidate treatments.

Water Solubilized Organics Removal Total System Bottle Test

1. Pour 100 mL of untreated low pressure (LP) separator effluent water and a production proportionate amount of LP separator effluent oil into a 6 oz. (180 mL) prescription bottle. Adjust total volume to leave at least 50-mL headspace.
2. Inject the WSO test product at at least one realistic rate (typically from 50 ppm to 1000 ppm). Include a blank.
3. Shake the samples with an overhand 3" (8 cm) stroke 4 times per second for 12.5 seconds (50 strokes).
4. Inject the current reverse emulsion breaker (REB) product at its current treatment rate.
5. Shake the samples with an overhand 3" (8 cm) stroke 4 times per second for 12.5 seconds (50 strokes).
6. Let settle for the residence time of the gravity separation system.
7. Inject the current flotation aid product at its current treatment rate.
8. Shake the samples with an overhand 3" (8 cm) stroke 4 times per second for 12.5 seconds (50 strokes).
9. Let settle for the residence time of the flotation separation system.
10. Observe and record the clarity of the water.
11. If the water is clear, stopper the bottle with a clean, gloved thumb, invert it and drain the contents into a separatory funnel. (If the water is not clear, a new clarification treatment will need to be developed to evaluate the WSO candidate.)
12. Let settle briefly then drain the water into another prescription bottle.
13. Add 1 mL of 15% HCl acid to the water sample and shake a few times to mix.
14. Observe the volume of water in the bottle and add 20% of that amount of Freon.
15. Shake the samples with an overhand 3" (8 cm) stroke 4 times per second for 12.5 seconds (50 strokes).
16. Stopper the bottle with a clean, gloved thumb and invert it (or pour it into a separatory funnel) and drain the Freon through an analytical grade paper filter into a beaker.
17. Pour filtered Freon into a quartz IR cell and measure IR absorbance on an instrument calibrated to ppm of the local Oil & Grease. Record value as "Total Acidified Extracted O&G".
18. Return Freon to beaker and immediately rinse cell with clean Freon.
19. Fill cell with clean Freon and re-verify absorbance blank.
20. Add ¼ tsp. (1.5 g) silica gel (SG) to the beaker and swirl thoroughly but carefully.
21. Pour the SG treated Freon through a new paper filter into the emptied IR cell.
22. Re-measure IR absorbance. Record value as "SG Treated Acidified Extracted O&G".
23. The amount of WSO in the water is defined as the difference between SG Treated and the Total Acidified Extracted O&G.

Note: Because of imperfect modeling of the dynamics of the water clarification system in the test, the total oil and grease is not as well predicted by these test results as is the WSO, which more reflects a shift in equilibrium. Nevertheless, a minimal level of total oil and grease removal must be achieved in the test for the results to be valid.

Treatment Tested

A large number of experimental treatments, of several different chemical types, reflecting various theoretical mechanisms of actions, were tested. Results are summarized in Tables I and II and the FIGURE and discussed below.

TABLE I

Chemical Response, in ppm

| Acid Type | Dose ppm | Water Clarity No Anionic | Water Clarity With Anionic | WSO Pre-Flote | O&G Post-Flote* |
|---|---|---|---|---|---|
| $HPO(OH)_2$ | 700 | dirty | clear | 4.1 | 67.5 | 14.1 |
| HCl | 370 | dirty | clear | 2.2 | 86.6 | 12.2 |
| HOAcOH (inv.) | 700 | dirty | clear | 1.1 | 90.9 | 11.1 |
| $MeSO_2(OH)$ | 700 | dirty | clear | 3.2 | 83.4 | 13.2 |
| HPO(OH) | 500 | dirty | clear | 6.0 | 74.2 | 16.0 |
| Blank | 0 | clear | clear | 27.8 | 50.5 | 37.8 |

*actual performance of system = WSO + 10 ppm

TABLE II

Dose Response of Acidic Chemicals

| | $H_2(HPO_3)$ | | | HCl | | | (inventive) H(HOAcO) | | | $H(MeSO_3)$ | | | $H(H_2PO_2)$ | | |
|---|---|---|---|---|---|---|---|---|---|---|---|---|---|---|---|
| Dose | Active | | WSO | Active | | WSO | Active | | WSO | Active | | WSO | Active | | WSO |
| Sample | mg/L | mEq/L | mg/L | mg/L | mEq/L | mg/L | mg/L | mEq/L | mg/L | mg/L | mEq/L | mg/L | mg/L | mEq/L | mg/L |
| 0 | 0 | 0 | 27.8 | 0 | 0 | 27.8 | 0 | 0 | 27.8 | 0 | 0 | 27.8 | 0 | 0 | 27.8 |
| 250 | 175 | 4.3 | 12.7 | 93 | 2.5 | 18.0 | 175 | 2.3 | 14.7 | 175 | 1.8 | | 125 | 1.9 | |
| 500 | 350 | 8.5 | 8.9 | 185 | 5.1 | 11.4 | 350 | 4.6 | 11.7 | 350 | 3.6 | 14.8 | 250 | 3.8 | 16.2 |
| 750 | 525 | 12.8 | 4.8 | 278 | 7.6 | 6.4 | 525 | 6.9 | 2.2 | 525 | 5.5 | | 375 | 5.7 | |
| 1,000 | 700 | 17.1 | 4.1 | 370 | 10.1 | 2.2 | 700 | 9.2 | 1.1 | 700 | 7.3 | 3.2 | 500 | 7.6 | 6.0 |

Confidence = +/− 15% relative SD, n = 7

A hydrophilic AHA of this invention (α-OH acetic acid) was added to actual produced water with a pH of 7 on a platform in the Gulf of Mexico. The result of this trial was as follows:

TABLE III

GoM Trial Result

| HOAcOH ppm | WSO ppm | O&G ppm |
|---|---|---|
| 0 | 47 | 56 |
| 245 | 22 | 33 |

A hydrophilic AHA of this invention (α-OH acetic acid) was added to actual produced water with a pH of 6.9 on another platform in the Gulf of Mexico. The results of this trial was as follows:

TABLE IV

GoM Trial Result II

| HOAcOH ppm | Cationic REB ppm | Anionic Polymer ppm | WSO ppm | O&G ppm |
|---|---|---|---|---|
| 0 | 3.0 | 3.0 | 27 | 34 |
| 175 | 3.0 | 3.0 | 19 | 25 |
| 210 | 3.0 | 3.0 | 13 | 26 |
| 210 | 2.5 | 3.5 | 13 | 20 |
| 305 | 2.0 | 4.0 | 9 | 16 |

After reducing the O&G from 34 ppm to 25 ppm with 175 ppm AHA through reductions in WSO, further reductions in WSO were met with a corresponding increase in insoluble oil, from 6 ppm to 13 ppm. Feeding additional anionic polymer (a methacrylic acid: methylmethacrylate: ethylacrylate terpolymer) at the expense of the cationic REB brought the insoluble oil back down to 7 ppm and allowed further reductions in the total O&G.

Corrosivity

Acid treatments are injected at high concentration into carbon steel (1018) produced water lines using stainless steel (316) or better quills. The resultant concentration in the carbon steel line is typically several hundred ppm. Under these conditions of actual use, the AHAs of this invention are appreciably less corrosive than even the mildest, inhibited mineral acid in use.

TABLE IV

Corrosion Data (conditions unreported)

| Acid | Conc. | C1018 Steel | 316L SS |
|---|---|---|---|
| $H_2(HPO_3)$, inhibited | 70% | 2.58 mpy | 5.27 mpy |
| H(HOAcO), uninhibited | 50% | 8.25 mpy | 0.27 mpy |
| $H_2(HPO_3)$, inhibited | 420 ppm | 1.58 mpy | |
| H(HOAcO), uninhibited | 300 ppm | <0.01 mpy | |

TABLE V

Mud Bomb Corrosion Data
Test Temp. 150 F. (66° C.)
Pressure 500 psi (3,400 kPa)N₂
Duration 41 hrs

| Acid | Conc. | C1018 Steel | 316 SS |
|---|---|---|---|
| H₂(HPO₃), inhibited | 70% | 36.4 mpy | 50.5 mpy |
| H(HOAcO), inhibited | 70% | 15.8 mpy | 22.9 mpy |

Scale Formation

The Ca complex of hydroxyacetic acid is 150 times more soluble than the 100 ppm limit of phosphorous acid. Other metal salts are even more soluble, as shown below.

TABLE VI

Aqueous Solubility of Hydroxyacetate Metal Complexes

| Metal | Temp. ° F. (° C.) | | Solubility, wt % |
|---|---|---|---|
| Na | 68 | (20) | 40.9 |
| K | 68 | (20) | 56.6 |
| Mg | 64 | (18) | 7.3 |
| | 82 | (28) | 7.7 |
| | 140 | (60) | 10.8 |
| | 212 | (100) | 23.0 |
| Ca | 63 | (17) | 1.2 |
| | 82 | (28) | 1.5 |
| | 140 | (60) | 3.8 |
| | 212 | (100) | 4.4 |
| Pb | 59 | (15) | 20.6 |
| | 212 | (100) | 3.3 |
| Zn | 68 | (20) | 3.3 |

In the foregoing specification, the invention has been described with reference to specific embodiments thereof. It has been demonstrated as effective in providing methods and compositions for removing WSO from water that has low corrosivity with respect to the iron-alloy materials and equipment it comes into contact with, as well as reduced scaling potential. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of AHAs, anionic polymers and other components falling within the claimed parameters, but not specifically identified or tried in a particular composition or under specific conditions, are anticipated to be within the scope of this invention.

I claim:

1. A method for removing solubilized organics from a water-like fluid phase comprising:
    contacting the water-like fluid phase with an effective amount of a hydrophilic α-hydroxymonocarboxylic acid (AHA); and
    separating at least one solubilized organic from the water-like fluid phase in the absence of a mineral acid.

2. The method of claim 1 where the AHA has a pK$_a$ of greater than 3.8.

3. The method of claim 1 where the AHA has the structure RR'C(OH)COOH where
    R and R' are independently selected from the group consisting of hydrogen and nonacidic hydrocarbonaceous groups,
    with the proviso that $$n^H 0.5(n^C) - 7(n^O) < 15(n^{OH})$$

where
    n$^H$=the total number of hydrogens on carbons,
    n$^C$=the total number of carbons,
    n$^O$=the total number of oxygens not attached to hydrogens, and
    n$^{OH}$=the total number of —OH groups in the molecule.

4. The method of claim 1 where the AHA is hydroxyacetic (glycolic) acid.

5. The method of claim 1 where the proportion of AHA in the water-like fluid phase ranges from about 20 to 2000 ppm.

6. The method of claim 1 further comprising contacting the water-like fluid phase with an anionic polymer.

7. The method of claim 6 where the anionic polymer is selected from the group consisting of poly(acrylic acid) and poly(methacrylic acid) and salts thereof, poly(acroyl sulfonic acid) and poly(vinyl sulfonic acid) and salts thereof, and copolymers of the aforementioned polymers with acrylic amides and esters, and mixtures thereof.

8. The method of claim 6 where the proportion of anionic polymer in the fluid ranges from about 0.2 to 20 ppm active polymer based on the water-like fluid phase.

9. The method of claim 6 where the anionic polymer and the AHA are added to the water-like fluid phase together.

10. The method of claim 1 where the water-like fluid phase is mixed or produced with an oil-like fluid phase.

11. The method of claim 1 where the water-like fluid phase is contaminated with solubilized organics where the method further comprises
    contacting the water-like fluid phase with an oil-like fluid phase; and
    transferring the organics from the water-like fluid phase into the oil-like fluid phase with the assistance of the AHA.

12. A method for removing water solubilized organics (WSO) from a water-like fluid phase comprising:
    contacting the water-like fluid phase with from about 20 to 2000 ppm of a hydrophilic α-hydroxymonocarboxylic acid (AHA) based on the total fluid, where the AHA has the structure RR'C(OH)COOH where R and R' are independently selected from the group consisting of hydrogen and nonacidic hydrocarbonaceous groups,
    with the proviso that $$n^H + 0.5(n^C) - 7(n^O) < 15(n^{OH})$$

where
    n$^H$=the total number of hydrogens on carbons,
    n$^C$=the total number of carbons,
    n$^O$=the total number of oxygens not attached to hydrogens, and
    n$^{OH}$=the total number of —OH groups in the molecule; and
    separating at least one solubilized organic from the water-like fluid phase in the absence of a mineral acid.

13. The method of claim 12 where the AHA has a pK$_a$ of greater than 3.8.

14. The method of claim 12 where the AHA is hydroxyacetic(glycolic) acid.

15. The method of claim 12 further comprising contacting the water-like fluid phase with an anionic polymer.

16. The method of claim 15 where the anionic polymer is selected from the group consisting of poly(acrylic acid) and poly(methacrylic acid) and salts thereof, poly(acroyl sulfonic acid) and poly(vinyl sulfonic add) and salts thereof, and copolymers of the aforementioned polymers with acrylic amides and ester, and mixtures thereof.

17. The method of claim 15 where the proportion of anionic polymer in the fluid ranges from about 0.2 to 20 ppm active polymer based on the water-like fluid phase.

18. The method of claim 15 where the anionic polymer and the AHA are added to the water-like fluid phase together.

19. The method of claim 12 where the water-like fluid phase is mixed or produced with an oil-like fluid phase.

20. The method of claim 12 where the water-like fluid phase is contaminated with solubilized organics where the method further comprises contacting the water-like fluid phase with an oil-like fluid phase; and transferring the organics from the water-like fluid phase into the oil-like fluid phase with the assistance of the AHA.

21. A method for removing water solubilized organics (WSO) from a water-like fluid phase comprising:

contacting the water-like fluid phase with an effective amount of a hydrophilic α-hydroxymonocarboxylic acid (AHA) having the structure RR'C(OH)COOH where R and R' are independently selected from the group consisting of hydrogen and nonacidic hydrocarbonaceous groups, with the proviso that $$n^H + 0.5(n^C) - 7(n^O) < 15(n^{OH})$$

where $n^H$=the total number of hydrogens on carbons, $n^C$=the total number of carbons, $n^O$=the total number of oxygens not attached to hydrogens, and $n^{OH}$=the total number of —OH groups in the molecule;

contacting the fluid with an anionic polymer; and separating at least one solubilized organic from the water-like fluid phase.

22. The method of claim 21 where the AHA has a $pK_a$ of greater than 3.8.

23. The method of claim 21 where the AHA is hydroxyacetic (glycolic) acid.

24. The method of claim 21 where the anionic polymer is selected from the group consisting of poly(acrylic acid) and poly(methacrylic acid) and salts thereof, poly(acroyl sulfonic acid) and poly(vinyl sulfonic acid) and salts thereof, and copolymers of the aforementioned polymers with acrylic amides and ester, and mixtures thereof.

25. The method of claim 21 where the proportion of anionic polymer in the fluid ranges from about 0.2 to 20 ppm active polymer based on the water-like fluid.

26. The method of claim 21 where the water-like fluid phase is mixed or produced with an oil-like fluid phase.

27. The method of claim 21 where the water-like fluid phase is contaminated with organics where the method further comprises contacting the water-like fluid phase with an oil-like fluid phase; and transferring the organics from the water-like fluid phase into the oil-like fluid phase with the assistance of the AHA.

* * * * *

UNITED STATES PATENT AND TRADEMARK OFFICE
CERTIFICATE OF CORRECTION

PATENT NO. : 6,695,968 B2
DATED : February 24, 2004
INVENTOR(S) : Paul R. Hart

It is certified that error appears in the above-identified patent and that said Letters Patent is hereby corrected as shown below:

<u>Column 3,</u>
Line 42, please delete "water-tike" and insert -- water-like --.

<u>Column 10,</u>
Line 1, please delete the formula "$n^H 0.5(n^c)-7(n^O)<15(n^{OH})$" and insert -- $n^H+0.5(n^C)-7(n^O)<15(n^{OH})$ --.

Signed and Sealed this

Tenth Day of August, 2004

JON W. DUDAS
*Acting Director of the United States Patent and Trademark Office*